United States Patent [19]

Rohr

[11] Patent Number: 4,636,351

[45] Date of Patent: Jan. 13, 1987

[54] ARRANGEMENT FOR RECEIVING AND METHOD FOR HANDLING SPENT NUCLEAR REACTOR FUEL RODS

[75] Inventor: Franz Rohr, Erlangen, Fed. Rep. of Germany

[73] Assignee: Siemens Aktiengesellschaft, Munich, Fed. Rep. of Germany

[21] Appl. No.: 602,395

[22] Filed: Apr. 20, 1984

[30] Foreign Application Priority Data

Jun. 3, 1983 [DE] Fed. Rep. of Germany ......... 332007
Aug. 1, 1983 [EP] 08011983 ............................ 831075684
Aug. 1, 1983 [EP] European Pat. Off. ......... 831075684

[51] Int. Cl.[4] ............................................. G21C 19/00
[52] U.S. Cl. .................................. 376/272; 250/506.1; 250/507.1
[58] Field of Search ...................... 376/272; 250/506.1, 250/507.1

[56] References Cited

U.S. PATENT DOCUMENTS

| | | | |
|---|---|---|---|
| 4,152,602 | 5/1979 | Kaminski et al. | 376/272 |
| 4,209,420 | 6/1980 | Larker | 250/506.1 X |
| 4,288,699 | 9/1981 | van der Vlis | 376/272 |
| 4,446,098 | 5/1984 | Pomaibo et al. | 376/272 X |

FOREIGN PATENT DOCUMENTS

| | | | |
|---|---|---|---|
| 2726335 | 6/1977 | Fed. Rep. of Germany | 376/272 |
| 2106442 | 4/1983 | United Kingdom | 376/272 |

*Primary Examiner*—Peter A. Nelson
*Attorney, Agent, or Firm*—Kenyon & Kenyon

[57] ABSTRACT

A packing assembly comprises a transport and storage container with a jacket, bottom and a head part for receiving the fuel rods from preferably two nuclear reactor fuel assemblies and arranging the rods in the densest possible packing, preferably in a hexagonal array packing. The packing assembly further comprises a dense-packing device surrounding the transport and storage container and a guide tube bundle or baffle plate guide for introducing the fuel rods from a fuel assembly into the dense-packing device. The transport and storage container and the dense-packing device are designed so that the bottom of the container can be decoupled therefrom and inserted into the dense-packing device. The guide tube bundle or baffle plate guide is removably insertable into the dense-packing device. The dense-packing device includes clamping means for compressing the introduced fuel rods into a hexagonal array. Upon insertion of the jacket of the transport and storage container into the dense-packing device and coupling of the jacket to the bottom element, the densely packed fuel rod bundle can be removed from the dense-packing device.

15 Claims, 15 Drawing Figures

ARRANGEMENT FOR RECEIVING AND METHOD FOR HANDLING SPENT NUCLEAR REACTOR FUEL RODS

BACKGROUND OF THE INVENTION

The invention relates to an arrangement for receiving and to a method for handling spent nuclear reactor fuel rods.

In the operation of nuclear reactors in nuclear power plants it is necessary to replace the fuel rods of the fuel assemblies at periodic intervals. The removed fuel rods are taken either to a reprocessing plant or to final storage. Because of the worldwide bottle neck in reprocessing as well as in final storage, it is desirable to keep the cost for intermediate storage as low as possible. This objective can be reached by stacking the fuel rods, packed as densely as possible, in containers which are suitable for the storage as well as for transporting the fuel rods.

A container of this type is disclosed in European Pat. No. 5,623. In that container, which comprises a bottom support and side walls surrounding the fuel rods, a baffle is provided for inserting the fuel rods which has, on its side facing the fuel rods, slots determining the position of the individual fuel rods and against which the introduced fuel rods rest. Disadvantages of this container are that the rods cannot be stored in a densely packed array, e.g., a hexagonal array, because of the thickness of the baffle and that the guiding means for the baffle require stacking of the fuel rods with a pyramid-shaped longitudinal cross-section, so that maximum packing density is not possible either along the transverse or radial dimension or along the longitudinal dimension of the container. In addition to the disadvantage of poor space utilization, such containers have the further disadvantage of inadequate reoval of the decay heat developed by the fuel rods.

An object of the present invention to provide a packing arrangement and container in which these disadvantages are eliminated and with which it is possible to maximize packing density of the fuel rods in the container and at the same time optimize heat removal.

SUMMARY OF THE INVENTION

A packing assembly for arranging spent nuclear reactor fuel rods in a densely packed array or compressed bundle upon removal of the fuel rods from a nuclear fuel assembly in a nucler power plant comprises, in accordance with the present invention, a transport and storage container, a dense-packing container 81, a fuel rod guide, a coupling device, a first clamping device and a second clamping device.

The transport and storage container consists essentially of a first jacket part, a first bottom part detachably secured to the first jacket part at one end thereof and a top or head part removably mounted to the jacket part at an end thereof opposite the bottom part. The jacket has a height substantially equal to the length of the fuel rods and a cross-sectional area substantially equal to the area of the compressed bundle of fuel rods.

The dense-packing container 81 includes a second jacket part of larger dimensions than the jacket of the transport and storage container, a second bottom part fixed to the second jacket part at one end thereof, and an outwardly extending connecting flange at an end of the second jacket part opposite the second bottom part. At least the jacket of the transport and storage container is insertable into the dense-packing container 81 upon a loading of spent fuel rods thereinto and upon a lateral or horizontal shifting of the fuel rods from a first geometric array into a second geometric array more densely packed than the first array.

The coupling device is at least partially mounted to the bottom part of the dense-packing container 81 and is engageable with the bottom part and the jacket part of the transport and storage container for alternately coupling and decoupling the bottom part thereof to the corresponding jacket part. The fuel rod guide is removably insertable into the dense-packing container 81 prior to a loading of fuel rods thereinto. The guide serves to direct the fuel rods into positions in the first geometric array during a loading of the fuel rods into the dense-packing container 81, the jacket thereof having inside dimensions larger than the outside dimensions of the guide.

The first clamping device includes pressure bars shiftably mounted to the jacket of the dense-packing container 81 on an inner side thereof in the region of the bottom of the dense-packing container 81 for engaging and temporarily securing the bottom of the transport and storage container to the dense-packing container 81. The second clamping device is mounted to the jacket of the dense-packing container 81 at a plurality of longitudinally spaced positions along an inner side of that jacket. The second clamping device is inwardly shiftable at each of the spaced positions independently of the other positions for engaging the fuel rods in the dense-packing container 81 and shifting the same horizontally inwardly from the first geometric array to the second geometric array upon removal of the guide from the dense-packing container 81 after the completion of a loading operation.

A fuel rod bundle which has been compressed into a densely packed array by an assembly in accordance with the present invention results not only in an optimal space utilization but also excellent heat conduction due to a good transverse or lateral heat conductivity arising from the contact of the fuel rods with each other and with the envelope or jacket of the transport and storage container. In such a tightly compressed fuel rod bundle, the entire envelope surface of the transport and storage container is utilizable as a heat sink.

In accordance with a specific feature of the present invention, the guide includes a frame and a multiplicity of parallel guide tubes connected to each other and to the frame, the guide tubes being at least equal in number to the fuel rods to be received and packed in the transport and storage container. Each of the guide tubes has an inside diameter larger than the diameter of the fuel rods. The guide tubes are spaced from each other in rows, adjacent rows being offset from one another by a distance equal to approximately half the axial spacing between adjacent guide tubes within the rows.

Pursuant to a particular feature of the present invention, at least some of the guide tubes are bent or curved along their longitudinal dimensions. The guide tubes have input ends with axial positions corresponding to the positions in a nuclear reactor fuel assembly of fuel rods to be received by the packing assembly. The guide tubes have output ends spaced from each other in rows, the adjacent rows being offset from one another by a distance equal to approximately half of the axial spacing between adjacent guide tubes within the rows.

In an alternative embodiment of a feature of the present invention, the guide may include a plurality of parallel baffle plates one greater in number than the rows of fuel rods receivable by the packing assembly during a loading operation. The baffle plates are spaced from each other by a distance greater than the diameter of the fuel rods and have a width sufficiently large to accommodate an entire row of fuel rods between adjacent baffle plates. The guide further includes at an input end a multiplicity of parallel metal strips rigidly attached to the baffle plates and extending at right angles with respect thereto. The metal strips are laterally spaced from one another by a distance substantially equal to the spacing between adjacent fuel rods in rows of the nuclear reactor fuel assembly. The second clamping device includes between each pair of adjacent baffle plates a pair of clamping elements disposed at opposite sides of the baffle plates upon a commencement of fuel rod tranfer into the packing assembly. At least one of the clamping elements is shiftable inwardly with respect to the jacket of the dense-packing container 81 and the baffle plates for moving the fuel rods between the pair of adjacent baffle plates closer to each other. The second clamping device further includes means for staggering a row of fuel rods between a pair of adjacent baffle plates with respect to adjacent rows fuel rods by a distance approximately equal to half the diameter of the fuel rods.

The design of the fuel rod guide in accordance with the present invention permits a multiplicity of fuel rods to be inserted simultaneously into a packing assembly from a nuclear reactor fuel assembly. Theoretically, it is entirely possible to transfer all fuel rods simultaneously from the fuel assembly into the dense-packing container 81.

In accordance with further feature of the present invention, the bottom part and the top part of the transport and storage container are provided with apertures, whereby the removal of decay heat from the densely packed bundle of nuclear reactor fuel rods is facilitated in a wet storage condition, and heat-conductive dummy rods are insertable into empty spaces or pockets within the compressed fuel rod bundle for further facilitating the cooling of the bundle.

DETAILED DESCRIPTION OF THE INVENTION

Figure 1:
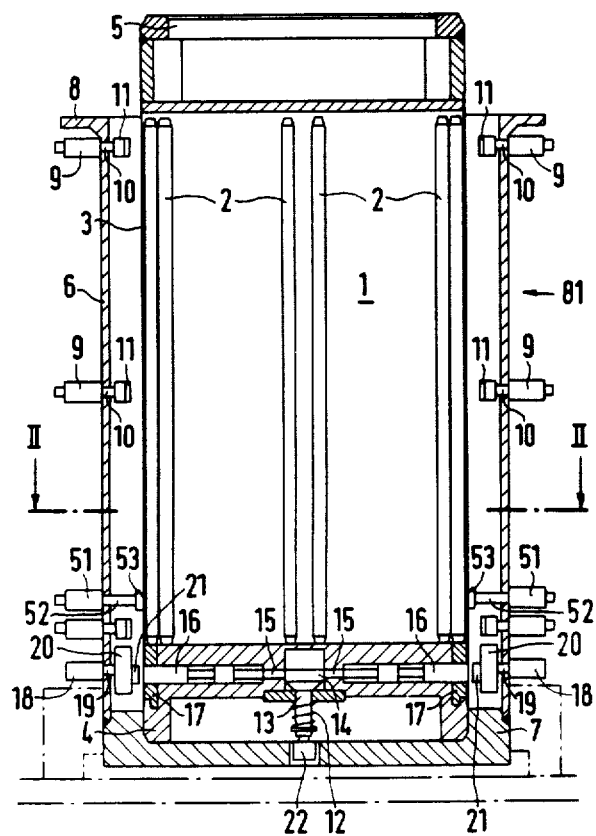
FIG. 1 is a longitudinal cross-section view of a packing assembly according to the present invention, showing a transport and storage container anchored in a dense-packing container 81 and filled with fuel rods.

As shown in FIG. 1, a packing assembly according to the present invention comprises a transport and storage container 1 for receiving spent nuclear reactor fuel rods 2 packed as densely as possible, the container having a jacket part 3, a bottom part 4 detachably secured to the jacket and a head or top part 5. In the operating state of the packing assembly illustrated in FIG. 1, container 1 is surrounded by a dense-packing container 81 having a rectangular jacket part 6, a bottom part 7 firmly connected thereto, and an outwardly extending connecting flange 8 integral with an end or rim of jacket 6 opposite bottom 7.

Figure 2:
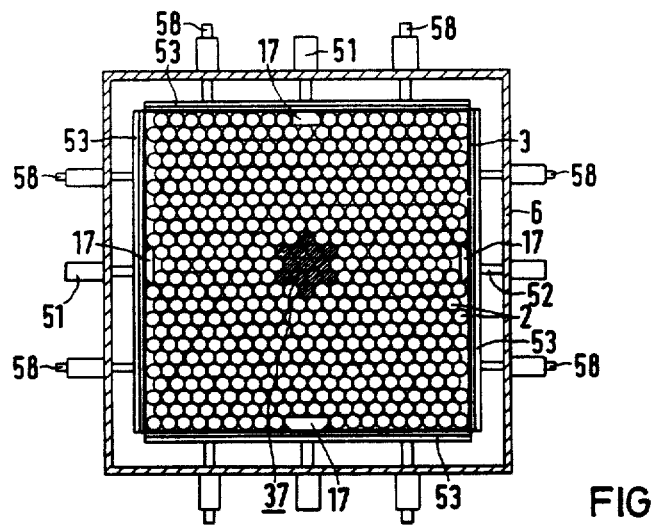
FIG. 2 is a transverse cross-section view taken along line II—II in FIG. 1.

As illustrated in FIG. 2, transport and storage container 1 has a rectangular cross-section with a side length such that, upon the dense-packing of nuclear fuel rods in a hexagonal array, slightly more than twice the quantity of fuel rods of a nuclear reactor fuel assembly can be accommodated in the container. In order to achieve the dense-packing of a hexagonal array, the dense-packing container 81 of the packing assembly is provided at longitudinally spaced positions, i.e., in different horizontal planes, with shifting elements 9 fastened to jacket 6 and connected via piston rods 10 to pressure strips or bars 11 which serve to densely pack the inserted fuel rods 2 in the desired manner, as described hereinafter. Pressure strips are connected to guide pins 58 which are supported in a sliding manner in linear guide bushings mounted to jacket part 6.

Bottom part 4 (FIG. 1) can be coupled to jacket 3 of transfer and storage container 1, as well as to jacket 6 of dense-packing container 81, and decoupled therefrom. If container 1 is to be provided with a square cross-section, the packing of the fuel rods within each row must be increased somewhat, slightly deviating from hexagonal packing (the densest possible packing) in favor of the row spacing.

Figure 3:
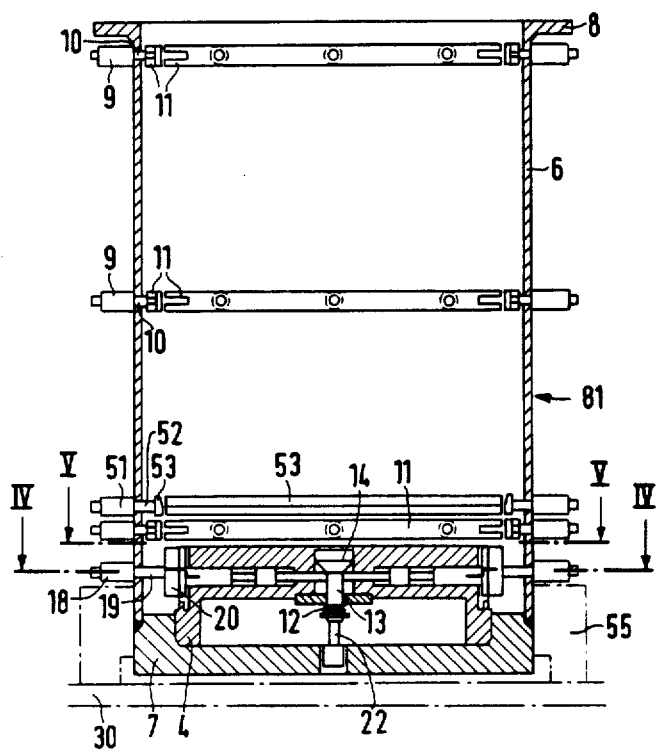
FIG. 3 is a longitudinal cross-section view of the dense-packing container 81 of FIGS. 1 and 2, showing a bottom element of the transport and storage container of FIGS. 1 and 2 inserted and a jacket part thereof removed.

In FIG. 3, the packing assembly is shown without jacket 3 but with bottom part 4 inserted into dense-packing container 81. In order to accomplish the attachment and removal of bottom 4, the element is provided with a centrally operable coupling device essentially consisting of a shifting pin 13 which can be moved vertically by a shifting element 22 against the force of a compression spring 12. Shifting pin 13 is provided with a partially conical and partially cylindrical extension 14 which pushes outwardly, in a lower position of the shifting pin, four holding plungers 15 (FIG. 4) supported in bushings 16. The plungers are pushed in such a manner that they come into engagement with corresponding bars 17 (FIG. 1) of jacket part 3 and couple the jacket 3 to bottom part 4. At the same time, nonillustrated compression springs are cocked. As shown in FIG. 3, the decoupling of bottom part 4 and jacket 3 is accomplished in the reverse manner, the shifting pin 13 being pushed by shifting element 22 into its upper end position, whereby holding plungers 15 are again pulled out of bars 17 by means of spring force and release jacket 3.

Figure 4:
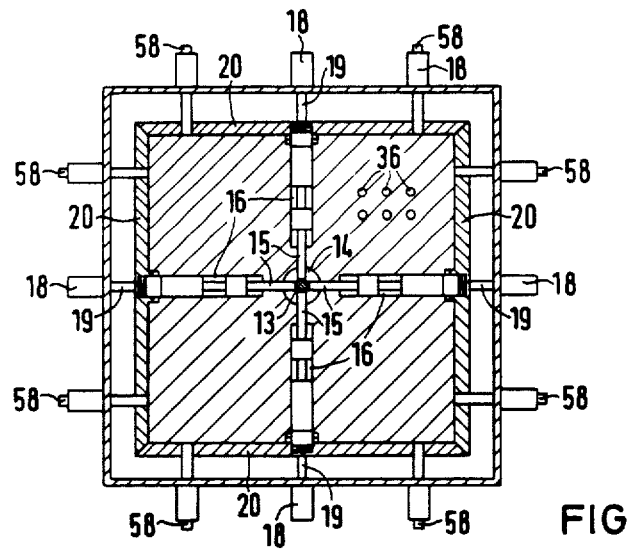
FIGS. 4 and 5 are transverse cross-section views taken along lines IV—IV and V—V, respectively, in FIG. 3.
Figure 5:
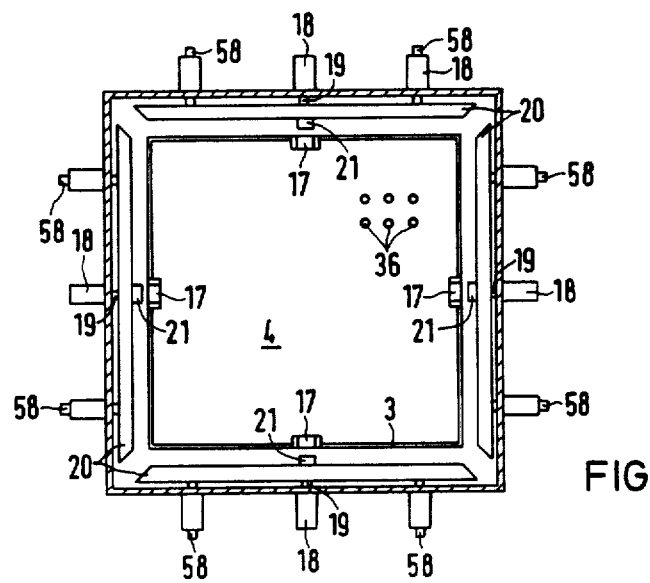

In order to connect bottom part 4, as shown in FIG. 3, to jacket 6 of dense-packing container 81, shifting pistons 19 reciprocable under the action of actuators or shifting elements 18 are provided. Shifting elements 18 are connected to pressure strips or bars 20, as illustrated in FIGS. 4 and 5, into which latching bolts 21 (FIG. 1) are resiliently inserted. Upon actuation of shifting elements 18, bars 20 are pressed against bottom part 4, thereby enlarging its area and simultaneously introducing latching bolts 21 (FIG. 1) into guide bushings 16 of holding plungers 15, so that container bottom part 4 is locked to the dense-packing container 81. The final state of this process is shown in FIG. 4 in cross-section. Actuating means may be electromechanical or hydraulic. If it is undesirable to drill through the jacket part for reasons of subsequently sealing the container, the locking device can be omitted.

Figure 6:
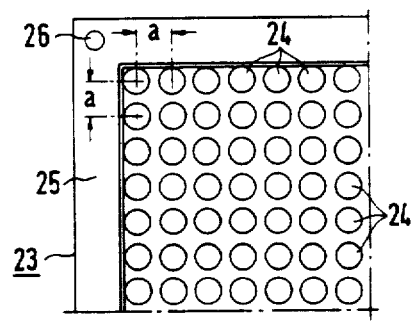
FIG. 6 is a partial top view of a fuel rod guide insertable into the dense-packing container 81 of FIGS. 1 and 3.
Figure 7:
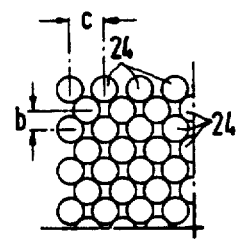
FIG. 7 is a schematic partial cross-section view of the guide of FIG. 6 on an output side at the bottom of the guide.

In the state shown in FIG. 3, the dense-packing container 81 according to the present invention is ready to receive guidance means for orienting and positioning the fuel rods 2 during introduction thereof into the dense-packing container 81. The guidance means advantageously comprises a bundle or array 23 of linear parallel guide tubes 24 (FIGS. 6–8) rigidly connected to each other and has a cross-sectional geometry (see FIG. 7) in which each tube 24 is enclosed by four adjacent tubes except for those of the outer rows. As illustrated in FIG. 7, tubes 24 have an axial spacing b in one direction while their spacing c in the direction perpendicular thereto is such that the fuel rods cannot jam or slip out of the assembly. With the guide tube array of FIG. 7 the fuel rods can be inserted only individually from the nuclear reactor fuel assembly into the guide tubes for most values of axial spacing c. If, however, the axial spacing c of tubes 24 is made equal to the axial spacing a (FIG. 6) of the fuel rods in the nuclear reactor fuel assembly, the fuel rods may be inserted row by row into dense-packing container 81.

In accordance with an embodiment of the present invention, the cross-sectional plane of guide tube bundle 23 on the input side, i.e., the relative positions of the input ends of the guide tubes 24, can be designed to correspond to the positions of the fuel rods in a fuel assembly with the axial spacing a in both directions (see FIG. 6), while the cross-section of the tube array on the ouput side, i.e., the relative positions of output ends of tubes 24, retains the geometry shown in FIG. 7. In this embodiment of the invention, tubes 24 have a slight S-shaped bend or curve from the input plane toward the output plane and from the outside of the tubular array to the inside thereof. The curved shape of tubes 24 does not in general prevent the fuel rods from being pushed through the tubes because the bend thereof is within the range of flexibility of the fuel rods.

The fuel rods can be introduced in groups or as a complete set into guide tube bundle 23 of a packing assembly according to the present invention. The cross-section of guide tube bundle 23 at the input end is advantageously rectangular so that the rods of two fuel assemblies can be introduced lying side by side.

Figure 8:
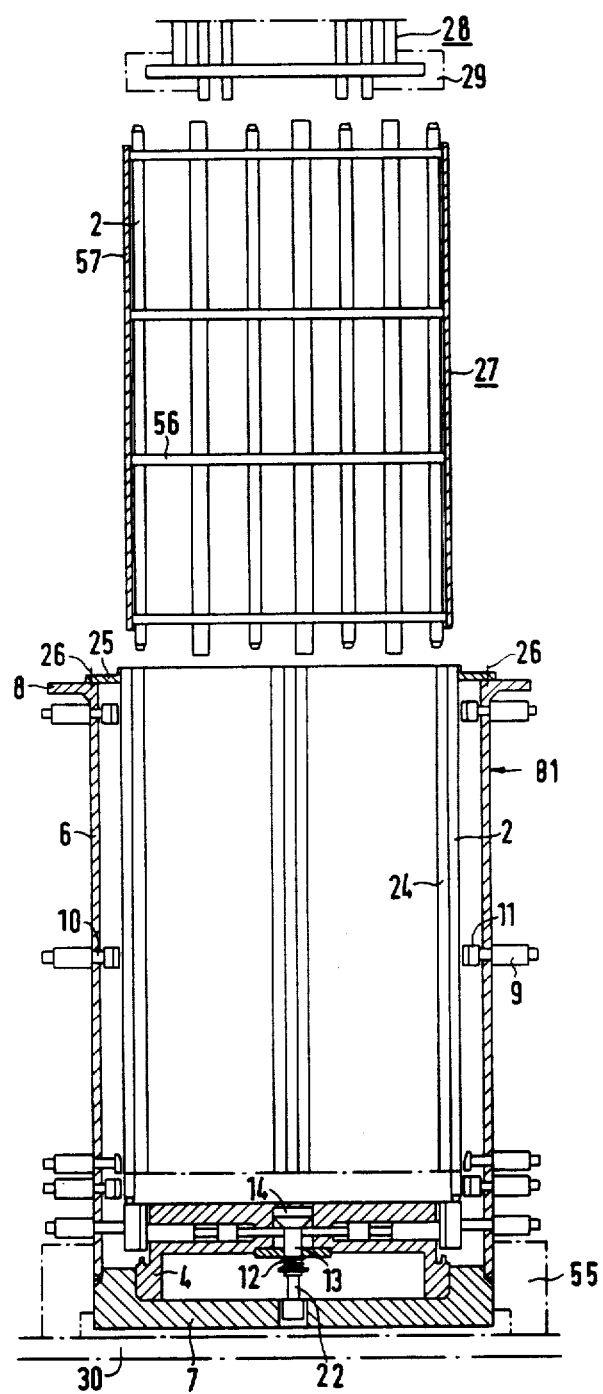
FIG. 8 is a longitudinal cross-section view of the dense-packing device of FIGS. 1 and 3 partially filled with fuel rods, a fuel assembly disposed over the dense-packing container 81 and a pressure device over the fuel assembly.

Guide tube bundle or array 23 has, on the input side, a frame 25 including an outwardly extending flange which serves in part to fasten the guide tube bundle to dense-packing container 81, as shown in FIG. 8. The cross-section of the dense-packing container 81 on the input side must have dimensions at least equal to the input cross-section of guide tube bundle 23. The dense-packing container 81 has a frame 8 with an outwardly extending connecting flange provided with drill holes or bores which are alignable with identical drill holes 26 in the flange of frame 25 and into which centering pins (not shown) can be inserted.

As illustrated in FIG. 8, a dense-packing container 81 with a bundle of guide tubes 24 inserted therein is positionable under a nuclear reactor fuel assembly 27, from which the head or top and the base part have been removed and which is held in spacers 56 by means of a support device 57. A pressure device 28 is centered above fuel assembly 27 by means of a coordinate transporting system 29, so that fuel rods 2 can be pushed by pressure device 28 from fuel assembly 27 into guide tubes 24 individually, in rows, in groups or, if possible, as a complete set. If necessary, every fuel rod 2 can be introduced here into a given, definable position.

The insertion of fuel rods 2 from a nuclear reactor fuel assembly into the bundle 23 of guide tubes 24 is in principle independent of the cross-sectional geometry of the fuel rods in the fuel assembly, i.e., of the relative positions of the rods in the assembly, and also of the external shape of the fuel assembly. If the structure of guide tube bundle 23 at its input end cannot be adapted to the fuel rod arrangement in the fuel assembly, pressure device 28 and fuel assembly 27 can be juxtaposed to the guide tube bundle by means of coordinate transporting system 29, 30 and 55 so that all fuel rods can be inserted into the guide tube bundle 23 in a defined position even if the cross-sectional geometry of fuel rods and guide tube bundle 23 is not identical.

Guide tubes 24 have an inside diameter at least slightly larger than the outside diameter of fuel rods 2, whereby the rods can be pushed through tubes 24 even if the fuel rods are slightly bent, which bending is not an uncommon occurrence.

Upon the emptying of a first fuel assembly, the dense-packing device is conveyed by means of coordinate transporting system 30 and 55 to a second fuel assembly. Upon the emptying of the second fuel assembly, fuel rods 2 are located in the bundle of guide tubes 24 with a packing density corresponding to that of the guide tubes in FIG. 7.

Because guide tubes 24 of tube bundle 23 are spaced from each other on the exit side and because of the wall thickness of the guide tubes, this density is, of course, not the densest possible. In order to further increase the fuel rod density, guide tube bundle 23 must be removed from dense-packing container 81, leaving rods 2 behind, so that the rods can be inwardly or horizontally shifted and compressed with respect to each other and, in particular, so that a hexagonal packing can be attained. The structure of guide tube bundle 23 on the exit side, shown in FIG. 7, has the advantage that, except for the rods at the periphery of the bundle, each individual fuel rod is stably enclosed on four sides and is stably retained in position in the phase between the removal of the guide tube bundle and the dense-packing, and does not jam, particularly in the outer layers.

Figure 9:
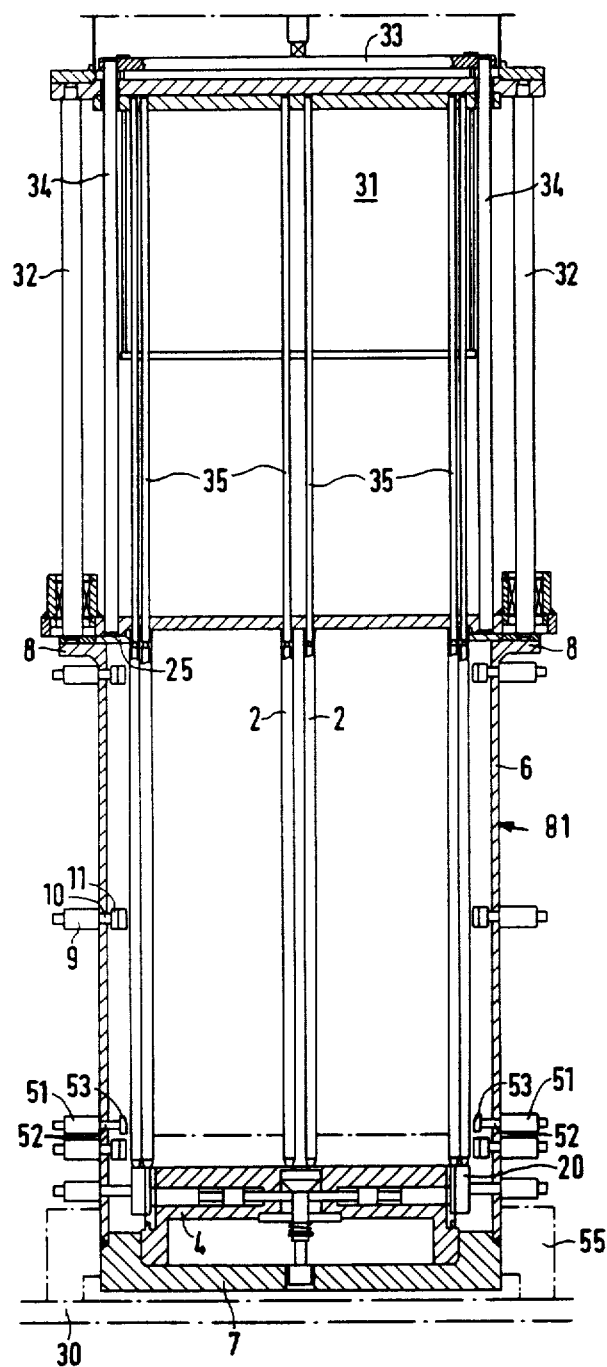
FIG. 9 is a longitudinal cross-section view of the dense-packing device of FIG. 1, 3 and 8 filled with fuel rods, showing a device above the dense-packing container 81 for removing the guide.

The withdrawal of guide tube bundle 23 from dense-packing container 81 is accomplished by means of a special extraction device 31 illustrated in FIG. 9. Such an extraction device is disclosed in German patent document DE-A-32 42 878, and its operation therefore does not need to be explained in detail here. The device consists essentially of (a) fastening and centering cylinders 32 fastened to flange 8 of the dense-packing device, (b) a pulling device 33 which grips or holds via rods 34 the frame 25 of guide tube bundle 23, and (c) hold-down or arresting rods 35, which correspond in number to the fuel rods in the guide tube bundle and which hold the rods stationary with respect to dense-packing container 81 during withdrawal of guide tube bundle 23. While guide tube bundle 23 is pulled up slowly, pressure strips or bars 11 (FIG. 3) at the lowest longitudinal or horizontal position are moved inwardly toward fuel rod bundle 23, thereby densely packing the fuel rods in a block. Upon the attainment by guide tube bundle 23 of the next higher plane of pressure strips 11, these strips are operated too, i.e., shifted horizontally inwardly. Upon completed withdrawal of guide tube bundle 23, the entire fuel rod bundle is tightly compressed into a densely packed, preferably hexagonal array in dense-packing container 81.

The dense-packing container 81 holding the densely pressed fuel rod bundle is then conveyed by means of coordinate transporting system 30 and 55 into the position shown in FIG. 10, in which dense-packing container 81 is disposed below jacket 3 and top part 5 of transport and storage container 1. Jacket 3 is now inserted into dense-packing container 81 between jacket 6 thereof and the fuel rod bundle, pressure strips 11 at the uppermost plane being shifted outwardly upon the attainment thereof by the lower edge of jacket 3, whereby an empty space is generated between the fuel rod bundle and the pressure strips to enable further lowering of jacket 3. The same process is repeated when the next pressure strip level is reached by the lower edge of jacket 3. Upon the disengagement of the pressure strips of the lowest plane and the return of pressure bars 20 (FIGS. 3, 4 and 5), jacket 3 assumes the position shown in FIG. 1. Jacket part 3 is then coupled by means of shifting elements 12, 13, 14 and 22, to bottom part 4, removed from dense-packing container 81 by means of the existing fuel assembly loading machine, for instance, and taken to a storage pit.

To prevent the compressed bundle of fuel rods from developing an inordinately large amount of decay heat, transport and storage container 1 can first be maintained in a wet condition for a period of time. In order to assure sufficient circulation of the coolant, bottom part 4 as well as head part 5 of the transport and storage container can be provided with holes 36 (FIGS. 4 and 5). After completion of the wet storage phase, parts 4 and 5 can be exchanged for unperforated parts before the transport and storage container is inserted into a dry storage device and sealed. Head part 5 is advantageously provided with similar coupling means as bottom part 4 to facilitate attachment and decoupling.

A further improvement in the removal of decay heat can be accomplished by inserting dummy cooling rods into the compressed fuel rod bundle. Owing to the geometric relationships between the transport and storage container and the nuclear reactor fuel assemblies, container 1 can hold more rods than there are in two fuel assemblies. Thus, the densely packed fuel rod bundle has empty spots or pockets which must be filled with dummies. Because the temperature is highest at the center of the densely packed fuel rod bundle, cooling dummies 37 (FIG. 2) are preferably placed in the center of the fuel rod bundle. The dummy rods are advantageously designed as to choice of material and cross-sectional shape to maximize heat removal, the otherwise useless pockets being thereby utilized for lowering the temperature more rapidly. The dummies can be distributed, of course, over the cross section of the fuel rod bundle should it turn out that center placement is not optimum.

Figure 10:
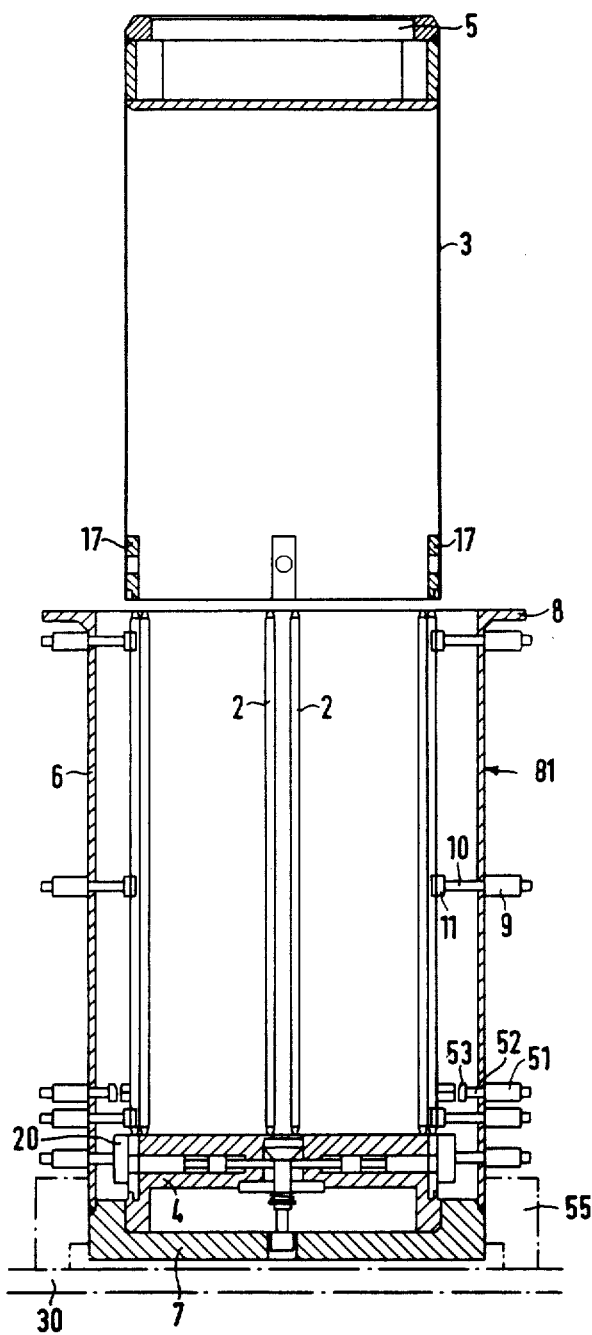
FIG. 10 is a longitudinal cross-section view of the dense-packing container 81 of FIG. 8, showing densely packed fuel rods and a jacket part and a head part of the transport and storage container of FIG. 1 held above the dense-packing container 81.
Figure 11:
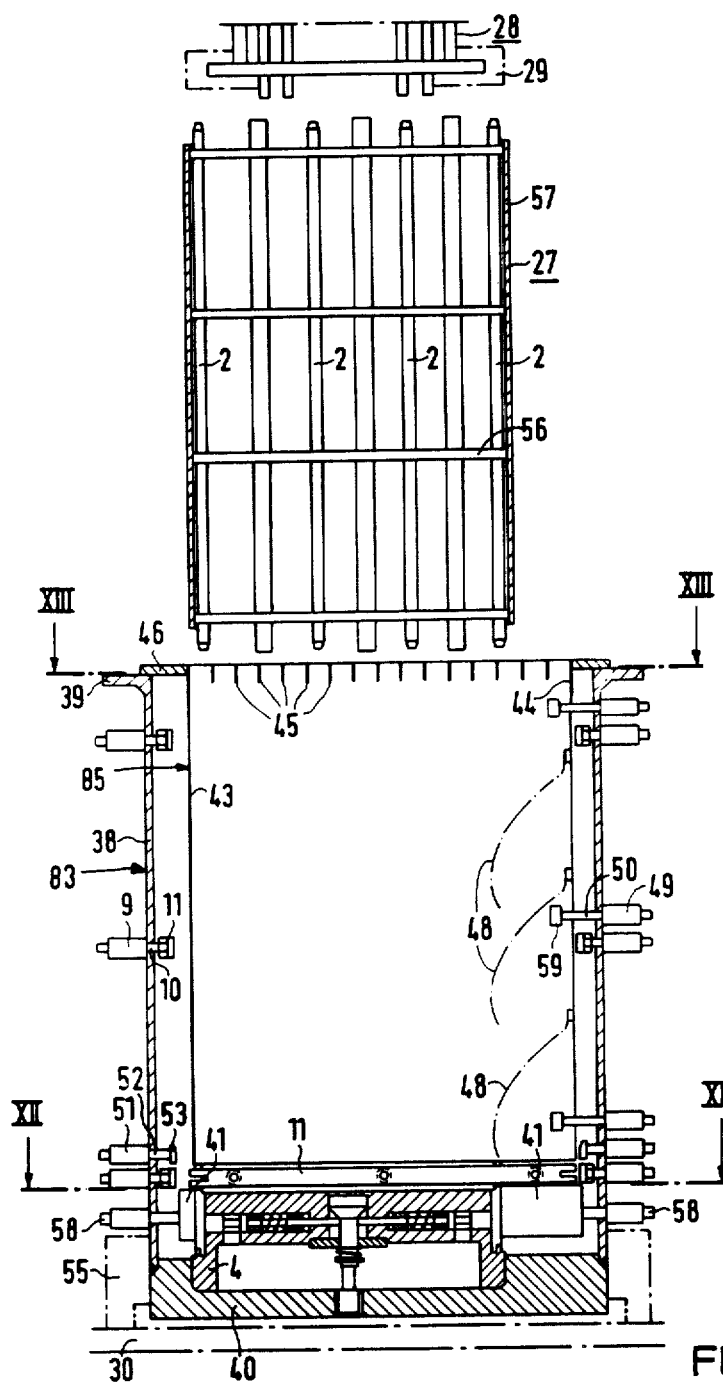
FIG. 11 is a longitudinal cross-section view of another dense-packing container 81 in accordance with the present invention, showing in cross-section a fuel assembly and schematically a pressure device disposed over the dense-packing container 81.
Figure 12:
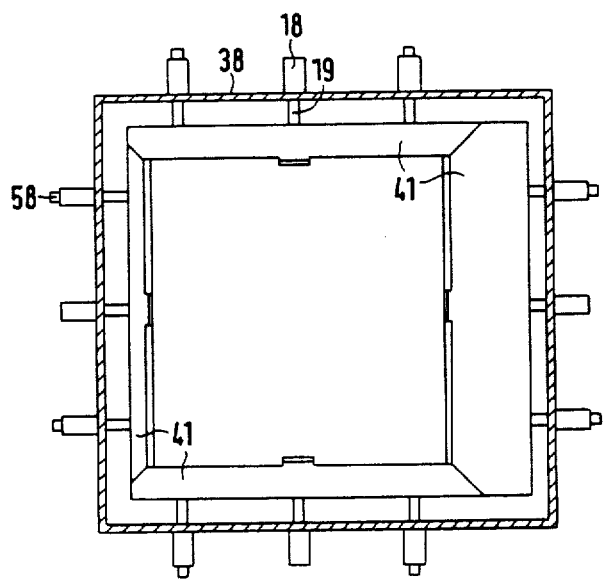
FIGS. 12 and 13 are transverse cross-section views taken along lines XII—XII and XIII—XIII, respectively, in FIG. 11.
Figure 13:
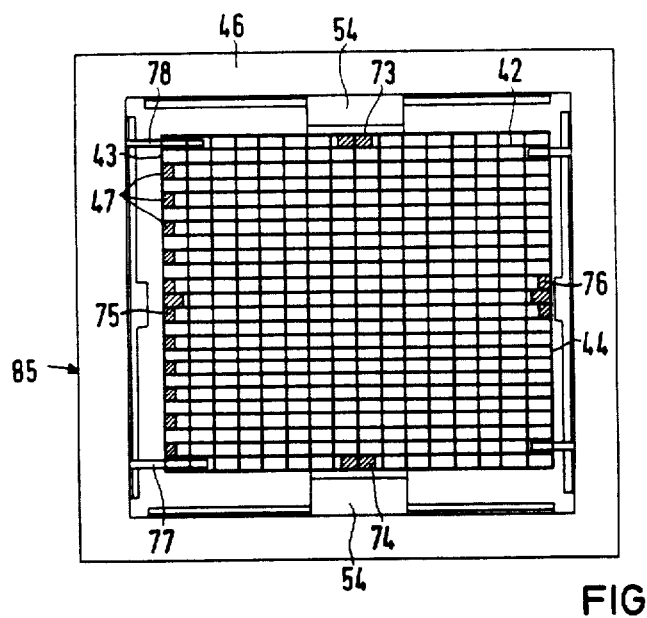
Figure 14:
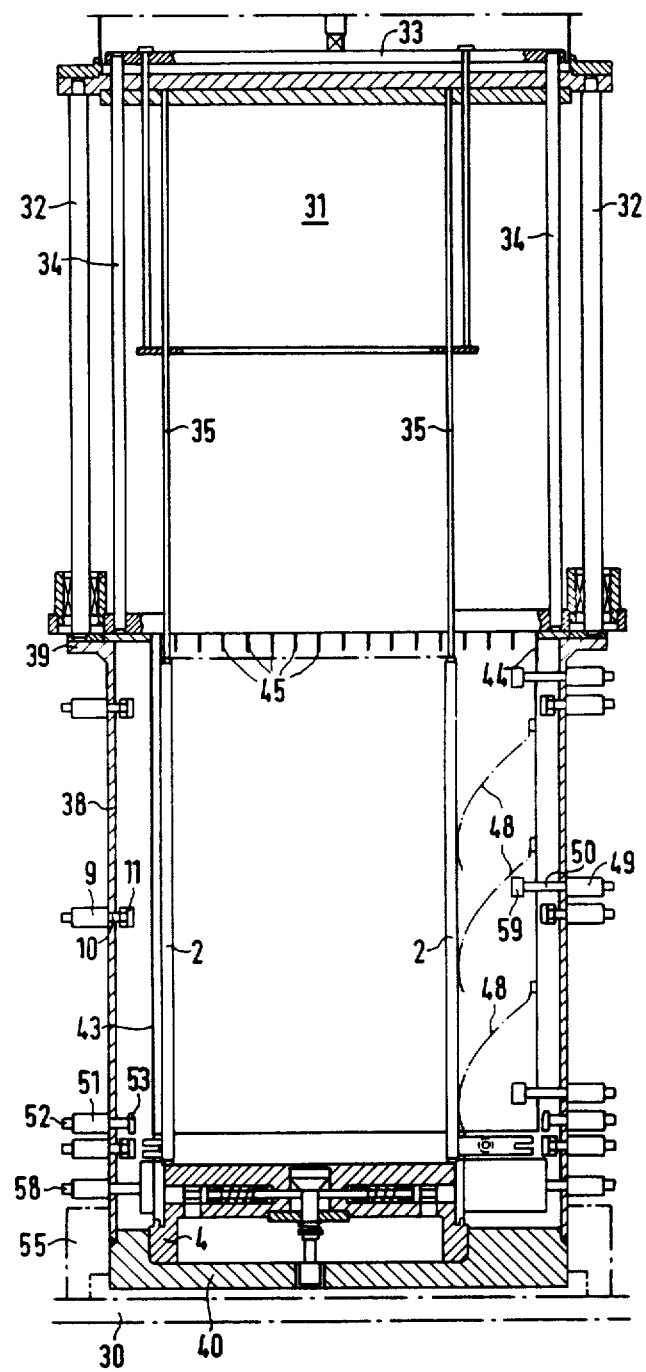
FIG. 14 is a longitudinal cross-section view of the dense-packing container 81 of FIG. 11 partially filled with fuel rods, showing a device in place above the dense-packing container 81 for pulling out the fuel rod guide.

A packing assembly with a basically different guide in accordance with the present invention for facilitating the insertion of the fuel rods into the dense-packing container 81 is shown in FIGS. 11—13. The geometry and the dimensions of transport and storage container 1 correspond to those shown in FIG. 1. As illustrated in FIG. 11, a dense-packing container 83 consists essentially of a rectangular jacket part 38, and an outwardly extending attachment flange 39 as well as a bottom part 40. Shifting elements 9, piston rods 10, pressure strips 11, and guide pins 58 are provided as described above. At the level of bottom part 4 of transport and storage container 1 are provided horizontally adjustable pressure bars 41 operated by shifting elements or actuators 18 via piston rods 19 and guided by pins 58. Bars 41 differ from bars 20 (FIG. 1) only as to their dimensions. Bars 41 serve in part to increase the usable area of the bottom of the transport and storage container in the desired manner. In FIGS. 11-14, those components, the design and operation of which are equivalent to those of corresponding components shown in FIGS. 1-10, are provided with the same reference designations.

As shown in FIGS. 11 and 13, a fuel rod guide 85 comprises a plurality of parallel baffle plates 42 one greater in number than the rows of fuel rods to be accommodated. The spacing and length of baffle plates 42 are seleected so that the fuel rods can be inserted into fuel rod guide 85 individually, in rows, in groups or as a complete set. In order to provide sufficient guiding stability for the fuel rods in both horizontal directions and to assure the base positions of the fuel rod rows required for the dense-packing procedure, baffle plates 42 (FIG. 13) are attached at one end to a stop plate or arrest 43 and at the other end to a short sheet metal rib or strip 44 (FIG. 11). Between arrest 43 and sheet metal rib 44, a multiplicity or parallel short sheet metal ribs or strips 45 are firmly connected to baffle plates 42 and are laterally spaced from each other by the distance between the fuel rods in the fuel assembly. Thus, fuel rod guide 85 appears in the top view (FIG. 13) to be a regular grid having the pitch of the fuel assembly. Fuel rod guide 85 has an outwardly extending rectangular attachment flange 46 welded at the top of the guide. Arrest or stop plate 43 is provided between every other pair of adjacent baffle plates 42 with a cross-sectionally rectangular rod or strip 47 which extends the height of the baffle plates and has a thickness equal to the radius of a fuel rod. Fuel rod guide 85 has a height sufficiently greater than the length of the fuel rods so that the lower edges of sheet metal ribs 45 do not engage the upper ends of the fuel rods when these are resting on bottom part 4 of the transport and storage container, whereby the fuel rods are freely movable in a direction parallel to the baffles after being inserted therebetween.

Fuel rod guide 85 including elements 42, 43, 44, 45, 46 and 47 is now introduced into the dense-packing container 83, as heretofore described with respect to guide tube bundle 23. Flange 46 of the guide is centered on the flange 39 of the dense-packing container. Dense-packing contaier 83 is then conveyed by coordinate transporting system 30 and 55 to a position under a fuel assembly 27 which is to be emptied, while the pressure device 28 is positioned directly above the fuel assembly 29 by coordinate transport system. Upon positioning, pressure device 28 pushes the fuel rod individually, in rows or in groups into fuel rod guide 85 inside the dense-packing device. As soon as the fuel rods are seated on bottom part 4 and consequently freely movable at the top in a direction parallel to the baffle plates 42, the rods are pushed either by springs 48, which must be arranged in at least three planes, or by similar members, for instance, shifting elements 49, 50 and 59, against stop plate 43 or strips 47.

Upon the emptying of one fuel assembly, dense-packing container 83 is moved to a position under a second fuel assembly by means of coordinate transporting system 30 and 55. The fuel rods of the second fuel assembly are then pushed into the dense-packing container via the guide insert as heretofore described. Upon loading of all the fuel rods, a device corresponding to pulling-off or extraction device 31 is disposed on dense-packing container 83 in alignment therewith, as heretofore described with respect to FIG. 9. Fuel rod guide 85 is withdrawn from dense-packing container 83, while the inserted fuel rods are held in position therein. During the withdrawal of the fuel rod guide, the pressure strips 11, located in longitudinally or vertically spaced positions, are successively actuated from the bottom to the top of the dense-packing container 81, as the lower edges of baffle plates 42 pass by the pressure strips. After the fuel rod guide is removed completely, the fuel rods are pressed into a block or bundle of the highest density. Jacket 3 with head part 5 is then mounted to bottom part 4, as already described. Fuel rod guide 85 including elements 42, 43, 44 and 45 may be designed so that the lower edges of sheet metal ribs 45 engage the upper ends of the fuel rods, whereby the grate formed by baffle plates 42 serves to hold the inserted fuel rods. Thus, it is possible to introduce all fuel rods into the guide and subsequently to pack them densely in the above-described manner. In this case, the above-mentioned pushing-on means can be omitted.

If jacket 3 of FIG. 10 is to be used with the dense-packing container 81 and fuel rod guide of FIGS. 11–14, it is necessary to provide appropriate spaces for strips or bars 17. For this purpose, as shown in FIG. 13, the two outer rows and the three middle rows, the rows being defined by pairs of baffle plates 42, must not be filled completely with fuel rods. In the outer rows, central areas 73 and 74 (shown hatched in FIG. 13) must be kept free of fuel rods, while in the three middle rows two end regions 75 and 76 must remain empty. Consequently, the fuel rods in the two outer rows must be packed densely from both sides in any case. This purpose is served by a pair of pressure pistons 77 and 78.

In order to facilitate the insertion of fuel rod guide 85, as well as of jacket part 3 of transport and storage container 1 into the dense-packing container, guide strips or bars 53 which are beveled along upper portions are disposed in the lower region of the dense-packing container, bars 53 being actuated by shifting elements 51 and 52. Instead of springs 48 or shifting elements 49, 50 and 59 which correspond in number to the fuel rod rows, parallel-guided comb-like pressure bars may be provided which are shiftable by actuators, the pressure bars having a comb height corresponding to the offset of the fuel rod rows. The insertion of fuel rod guide 85 may be further facilitated by beveled insertion bars 54 disposed at jacket 38 of the dense-packing container.

The fuel rod guide including elements 42, 43, 44, 45 and 47 may be modified by dispensing with stop plate 43 and strips or bars 47. Parallel baffle plates 42 are then open on both sides underneath the sheet metal ribs 44 and 45. In this case, the fuel rods, upon being inserted into guide 85, can be pressed into a densely packed bundle by means of shifting elements 49, 50 and 59 disposed on both sides of rectangular jacket part 38. The dense-packing stroke in the direction of the row can be cut in half thereby. In order to obtain the smallest possible dense-packing stroke also transversely thereto, the thickness of the sheet metal baffle plates 42 should be as small as possible. To this end it is necessary to make the pitch of the parallel rows of plates smaller than the pitch of the spacer or of the fuel rods in the fuel assembly, whereby the fuel rod can then be inserted only individually or by rows.

As mentioned above, bottom part 4 as well as head part 5 of transport and storage container 1 must be replaced by unperforated parts before the storage container is transferred from wet storage to dry storage. To facilitate this exchange, head part 5 advantageously has a structure similar to that of bottom part 4.

Figure 15:
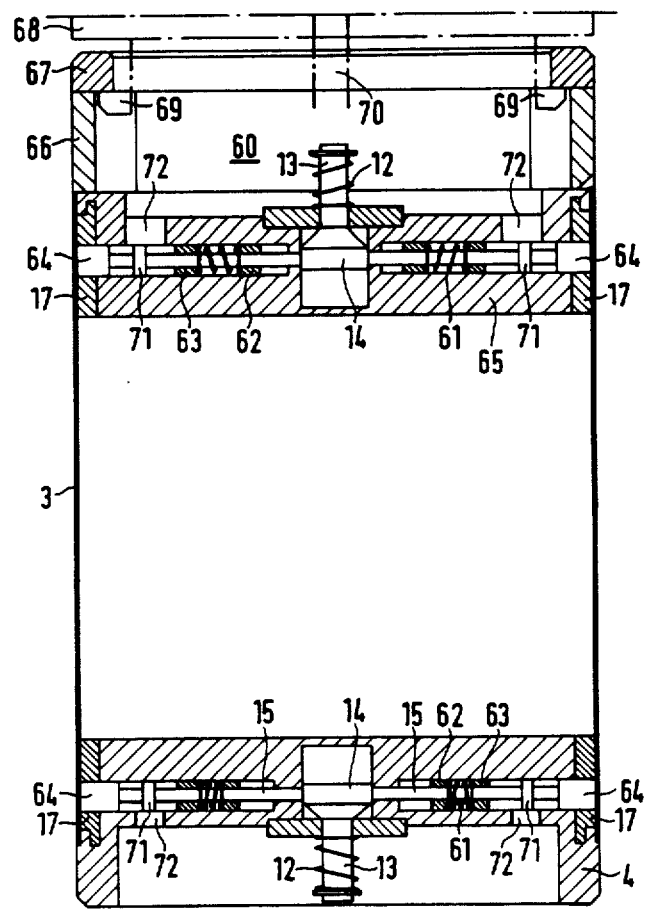
FIG. 15 is a longitudinal cross-section view of a transport and storage container with a detachable head or top part and a detachable bottom element.

A transport and storage container with such a head part 60, and a bottom part 4 as heretofore described, is shown in FIG. 15. Jacket 3 is provided at both ends with bars 17 having projections on the sides facing inwardly, i.e., facing head part 60 or bottom element 4. Bottom part 4 and head part 60 have at the corresponding points groove-shaped milling cuts which the projections engage so that an outward bulging of jacket 3 is prevented. Head part 60 and bottom part 4 are provided with coupling devices which act in the same way and can be operated centrally, as described above with reference to FIGS. 3 and 4.

In the state of the transport and storage container shown in FIG. 15, bottom part 4 as well as head part 60 are coupled to jacket 3. For removing head part 60 and bottom element 4, for instance, upon the transfer from wet storage to dry storage, shifting pins 13 with partially conical extensions 14 are moved toward the interior of the container by means of mechanical force transmission means against the forces exerted by compression springs 12. Helical compression springs 61 exert a force between a bushing 63 splined to the support body and a ring 62 firmly connected to a respective holding plunger 15. While shifting element 13 is in a retracted position under the action of spring 12, pistons 64 connected to plungers 15 extend into corresponding holes of bars 17 and thereby connect bottom part 4 and head part 5 to the upper and lower ends of jacket 3, respectively. Upon the inward shifting of element 13, plungers 15 and pistons 64 move inward by an amount such that they release jacket 3. Compression springs 12 push shifting pins 13 back into their positions shown if the pressure exerted on the shifting pins ceases. Similarly, plungers 15 return against the pressure of their respective springs 61 to the coupling positions shown in FIG. 15.

Head part 60 itself comprises coupling support 65 and a cover part disposed thereabove with an extension 66 and a terminating frame 67. These components of the head part are welded together. For handling the head part, a lifting tool 68 is provided with grippers for hooking frame 67. A schematically illustrated tubular opening 70 in the center of lifting tool 68 serves to enable the actuation of shifting pin 13 of head part 60 by means of appropriate mechanical force transmission means.

Mounted to plungers 15 are further rings 71 disposed in juxtaposition to respective openings 72 in the coupling support and accessible by means of a tool for locking and unlocking bottom part 4 and head 60 from the outside in the event that one of the holding plungers 15 should jam.

What is claimed is:

1. A packing assembly for arranging in a densely packed array spent nuclear reactor fuel rods upon removal thereof from a nuclear fuel assembly in a nuclear power plant, said packing assembly comprising:

a transport and storage container having a first jacket part, a first bottom part detachably connected to said jacket part at one end thereof and a top part removably mounted to said jacket part at an end thereof opposite said bottom part, said jacket part having a length substantially equal to the length of the fuel rods and a cross-sectional area substantially equal to the area of the densely packed array of fuel rods;

a dense-packing container 81 including a second jacket part of larger dimensions that said first jacket part, a second bottom part fixed to said second jacket part at one end thereof and an outwardly extending connecting flange at an end of said second jacket part opposite said second bottom part, at least said first jacket part of said transport and storage container being insertable into said dense-packing container 81 upon a loading of spent fuel rods thereinto and upon a lateral shifting of the fuel rods from a first geometric array into a seond geometric array more densely packed than said first geometric array;

coupling means at least partially mounted to said second bottom part and engageable with said first bottom part and said first jacket part for alternately coupling and decoupling said first bottom part to said first jacket part;

guide means, removably insertable into said dense-packing container 81 prior to a loading of fuel rods thereinto, for guiding the fuel rods into positions in said first geometric array during the loading of said rods into said dense-packing container 81, said second jacket part having inside dimensions larger than outside dimensions of said guide means;

first clamping means including pressure bars shiftably mounted to said second jacket part on an inner side thereof in the region of said second bottom part for engaging and temporarily securing said first bottom part to said dense-packing container 81;

second clamping means, mounted to said second jacket part at a plurality of longitudinally spaced positions along an inner side of said second jacket part and inwardly shiftable at each of said spaced positions independently of the other spaced positions, for engaging said fuel rods in said dense-packing container 81 and shifting said fuel rods transversely to a longitudinal axis of said second jacket part from said first geometric array to said second geometric array upon removal of said guide means from said dense-packing container 81 after a loading of said fuel rods into said dense-packing container 81.

2. The packing assembly defined in claim 1 wherein said transport and storage container and said dense-packing container 81 have sufficiently large cross-sectional areas to permit the packing into said transport and storage container of the fuel rods of at least two nuclear reactor fuel rod assemblies.

3. The packing assembly defined in claim 2 wherein said guide means includes a frame and a multiplicity of parallel guide tubes connected to each other and to said frame, said guide tubes being at least equal in number to the fuel rods to be received from a nuclear reactor fuel assembly and packed in said transport and storage container, each of said guide tubes having an inside diameter larger than the diameter of the fuel rods, said guide tubes being spaced from each other in rows, adjacent rows being offset from one another by a distance equal to approximately half the axial spacing between adjacent guide tubes within the rows.

4. The packing assembly defined in claim 2 wherein said guide means includes a frame and a multiplicity of guide tubes connected to each other and to said frame, said guide tubes being at least equal in number to the number of fuel rods to be received by said packing assembly from a nuclear reactor fuel assembly and packed into said transport and storage container, each of said guide tubes having an inside diameter larger than the outside diameter of the fuel rods, at least some of said guide tubes being curved along the longitudinal dimension thereof, said guide tubes having input ends with axial positions corresponding to the positions in a nuclear reactor fuel assembly of fuel rods to be received by said packing assembly, said guide tubes having output ends spaced from each other in rows, adjacent rows being offset from one another by a distance equal to approximately half of the axial spacing between adjacent guide tubes within the rows.

5. The packing assembly defined in claim 2 wherein said guide means includes a plurality of parallel baffle plates one greater in number than the rows of fuel rods receivable by said packing assembly during a loading operation, said baffle plates being spaced from each other by a distance greater than the diameter of the fuel rods and having a width sufficiently large to accommodate an entire row of fuel rods between adjacent baffle plates, said guide means further including at an input end a multiplicity of metal strips rigidly attached to said baffle plates and extending at right angles with respect thereto, said metal strips being laterally spaced from each other at a distance substantially equal to the spacing between adjacent fuel rods in a nuclear reactor fuel assembly, said second clamping means including between each pair of adjacent baffle plates a pair of clamping elements disposed at opposite sides of said baffle plates upon a commencement of fuel rod transfer into said packing assembly, at least one of said clamping elements being shiftable inwardly with respect to said second jacket part and said baffle plates for moving the fuel rods between said pair of adjacent baffle plates closer to each other, said second clamping means further including means for staggering a row of fuel rods between a pair of adjacent baffle plates with respect to adjacent rows of fuel rods by a distance approximately equal to half the diameter of the fuel rods.

6. The packing assembly defined in claim 5 wherein, in a loading state of said packing assembly, said metal strips have lower edges spaced from said first bottom part by a distance greater than the length of the fuel rods.

7. The packing assembly defined in claim 5 wherein, in a loading state of the packing assembly, said metal strips have lower edges spaced from said first bottom part by a distance less than the length of the fuel rods.

8. The packing assembly defined in claim 2 wherein said guide means includes on an input side a first portion comprising a frame and a multiplicity of guide tubes connected to each other and to said frame, each of said guide tubes having an inside diameter larger than the outside diameter of the fuel rods, at least some of said guide tubes being bent along the longitudinal dimension thereof, said guide tubes being disposed relative to each other to have input ends with positions corresponding to the positions of fuel rods in a nuclear fuel assembly and output ends disposed in rows offset from each other by a distance equal to approximately half of the spacing between adjacent guide tube output ends within the rows, said guide means further including on an output side a second portion comprising a plurality of parallel baffle plates one greater in number than the rows of fuel rods receivable by the packing assembly during a loading operation, said baffle plates being spaced from one another by a distance greater than the diameter of the fuel rods, said first portion and said second portion having a combined length approximately equal to the length of the fuel rods, the output ends of said guide tubes in said first portion being disposed in rows spaced from each other by a distance corresponding to the distance between adjacent baffle plates in said second portion at a transition region where said first portion and said second portion meet, whereby fuel rods received in said first portion are formed thereby into said first geometric array and are densely packed into said second geometric array in said second portion.

9. The packing assembly defined in claim 1 wherein said first bottom part and said top part are provided with apertures.

10. The packing assembly defined in claim 1 wherein said guide means includes a frame and a multiplicity of parallel guide tubes connected to each other and to said frame, said guide tubes being at least equal in number to the fuel rods to be received from a nuclear reactor fuel assembly and packed in said transport and storage container, each of said guide tubes having an inside diameter larger than the diameter of the fuel rods, said guide tubes being spaced from each other in rows, adjacent rows being offset from one another by a distance equal to approximately half the axial spacing between adjacent guide tubes within the rows.

11. The packing assembly defined in claim 1 wherein said guide means includes a frame and a multiplicity of guide tubes connected to each other and to said frame, said guide tubes being at least equal in number to the number of fuel rods to be received by said packing assembly from a nuclear reactor fuel assembly and packed into said transport and storage container, each of said guide tubes having an inside diameter larger than the outside diameter of the fuel rods, at least some of said guide tubes being curved along the longitudinal dimension thereof, said guide tubes having input ends with axial positions corresponding to the positions in a nuclear reactor fuel assembly of fuel rods to be received by said packing assembly, said guide tubes having output ends spaced from each other in rows, adjacent rows being offset from one another by a distance equal to approximately half of the axial spacing between adjacent guide tubes within the rows.

12. The packing assembly defined in claim 1 wherein said guide means includes a plurality of parallel baffle plates one greater in number than the rows of fuel rods receivable by said packing assembly during a loading operation, said baffle plates being spaced from each other by a distance greater than the diameter of the fuel rods and having a width sufficiently large to accommodate an entire row of fuel rods between adjacent baffle plates, said guide means further including at an input end a multiplicity of metal strips rigidly attached to said baffle plates and extending at right angles with respect thereto, said metal strips being laterally spaced from each other at a distance substantially equal to the spacing between adjacent fuel rods in a nuclear reactor fuel assembly, said second clamping means including between each pair of adjacent baffle plates a pair of clamping elements disposed at opposite sides of said baffle plates upon a commencement of fuel rod transfer into said packing assembly, at least one of said clamping elements being shiftable inwardly with respect to said second jacket part and said baffle plates for moving the fuel rods between said pair of adjacent baffle plates closer to each other, said second clamping means further including means for staggering a row of fuel rods between a pair of adjacent baffle plates with respect to adjacent rows of fuel rods by a distance approximately equal to half the diameter of the fuel rods.

13. The packing assembly defined in claim 1 wherein said guide means includes on an input side a first portion comprising a frame and a multiplicity of guide tubes connected to each other and to said frame, each of said guide tubes having an inside diameter larger than the outside diameter of the fuel rods, at least some of said guide tubes being bent along the longitudinal dimension thereof, said guide tubes being disposed relative to each other to have input ends with positions corresponding to the positions of fuel rods in a nuclear fuel assembly and output ends disposed in rows offset from each other by a distance equal to approximately half of the spacing between adjacent guide tube output ends within the rows, said guide means further including on an output side a second portion comprising a plurality of parallel baffle plates one greater in number than the rows of fuel rods receivable by the packing assembly during a loading operation, said baffle plates being spaced from one another by a distance greater than the diameter of the fuel rods, said first portion and said second portion having a combined length approximately equal to the length of the fuel rods, the output ends of said guide tubes in said first portion being disposed in rows spaced from each other by a distance corresponding to the distance between adjacent baffle plates in said second portion at a transition region where said first portion and said second portion meet, whereby fuel rods received in said first portion are formed thereby into said first geometric array and are densely packed into said second geometric array in said second portion.

14. A method for operating a packing assembly for arranging in a densely-packed array spent nuclear fuel rods, comprising the steps of:
- inserting a transport and storage container into said dense-packing container 81;
- connecting said first bottom part to said dense-packing container 81;
- detaching said first bottom part from a first jacket part;
- removing said first jacket part from said dense-packing container 81;
- inserting guide means into said dense-packing container 81 over said first bottom part;
- introducing nuclear reactor fuel rods into said guide means;
- withdrawing said guide means from said dense-packing container 81 upon introduction of all fuel rods from a nuclear reactor fuel assembly into said guide means;
- arresting the motion of the fuel rods during the withdrawal of said guide means from said dense-packing container 81, whereby fuel rods introduced into said guide means remain within said dense-packing container 81;
- inwardly shifting a second clamping means successively at adjacent spaced positions in a sequence from a lower end to an upper end of said dense-packing container 81 during withdrawal of said guide means from said dense-packing container 81, thereby compressing said fuel rods inwardly to form said second geometric array;
- inserting said first jacket part into said dense-packing container 81 between a second jacket part and the compressed bundle of fuel rods;
- outwardly shifting said second clamping means successively at adjacent ones of said spaced positions in a sequence from the upper end to the lower end of said dense-packing container 81 during insertion of said first jacket part between said second jacket part and the compressed bundle of fuel rods;
- coupling said first bottom part to said first jacket part upon completed insertion of said first jacket part into said dense-packing container 81;
- detaching said first bottom part from said dense-packing container 81; and
- removing said transport and storage container and the compressed bundle of fuel rods therein from said dense-packing container 81.

15. The method defined in claim 14, further comprising the step of inserting cooling tubes into spaces within the compressed bundle of fuel rods not occupied by fuel rods.

* * * * *